United States Patent [19]
Iwamura et al.

[11] Patent Number: 6,132,011
[45] Date of Patent: Oct. 17, 2000

[54] BRAKE PRESSURE CONTROL DEVICE

[75] Inventors: Moritaka Iwamura; Naoto Kondo, both of Hamakita, Japan

[73] Assignee: Nisshinbo Industries, Inc., Tokyo, Japan

[21] Appl. No.: 08/920,213

[22] Filed: Aug. 25, 1997

[30] Foreign Application Priority Data

Aug. 26, 1996 [JP] Japan ................................ 8-242589

[51] Int. Cl.⁷ ....................................................... B60T 8/40
[52] U.S. Cl. ................................... 303/116.4; 303/119.2; 439/34
[58] Field of Search ............................. 303/119.2, 119.1, 303/116.4, 113.1, 10, 11; 439/34

[56] References Cited

U.S. PATENT DOCUMENTS

| | | | |
|---|---|---|---|
| 5,288,141 | 2/1994 | Isshiki et al. ........................ | 303/113.1 |
| 5,407,260 | 4/1995 | Isshiki et al. ........................ | 303/119.2 |
| 5,449,226 | 9/1995 | Fujita et al. ......................... | 303/116.4 |
| 5,452,948 | 9/1995 | Cooper et al. ....................... | 303/119.2 |
| 5,466,055 | 11/1995 | Schmitt et al. ...................... | 303/119.2 |
| 5,529,389 | 6/1996 | Sekiguchi ............................ | 303/116.4 |
| 5,769,508 | 6/1998 | Gilles et al. ......................... | 303/116.4 |

FOREIGN PATENT DOCUMENTS

WO 94/03352  2/1994  Germany .............................. 303/119.3

*Primary Examiner*—Michael Mar
*Assistant Examiner*—Devon Kramer
*Attorney, Agent, or Firm*—Bret Field, Bozicevic, Field & Francis

[57] ABSTRACT

A brake pressure control device is provided in which the external wiring can be eliminated to enable a more compact design, and simultaneously, the power supply to the motor is more reliably waterproof. The wiring for the power supply conductors 51, 60 of the motor is passed internally through the valve block 30 of the brake pressure unit 10, and the electrical terminals of said power supply conductors 51, 60 are connected electrically to the control substrate 23 of the electronic control unit 20.

8 Claims, 7 Drawing Sheets

BRAKE PRESSURE CONTROL DEVICE

CROSS-REFERENCE TO RELATED APPLICATIONS

This application claims priority to Japanese application 8-242589 filed Aug. 26, 1996 to which application priority is claimed under 35 U.S.C. § 119 and which application is incorporated herein by reference.

BACKGROUND OF THE INVENTION

1. Field of the Invention

This invention relates to a brake pressure control device for a vehicle equipped with an antilock brake system (ABS), a traction control system (TCS) or other device which electronically controls the brake pressure of the wheels; more specifically, it relates to a brake pressure control device with an improved power supply system to the motor for driving the hydraulic pump in the brake pressure unit.

2. Description of the Related Art

An integrated type of brake pressure control device is publicly known, comprised of a brake pressure unit equipped, in the main, with a plural number of solenoid valves, a hydraulic pump and a motor to drive these parts, and an electronic control unit which controls the power supply to said parts. This latter electronic control unit is integrally attached to the brake pressure unit to form a single unit.

The aforementioned motor is equipped with a power supply harness with attached connector which is mounted to straddle the exterior of the brake pressure unit, and is connected to the connector molded on the electronic control unit.

The aforementioned external wiring of the motor requires said power supply harness for the motor, as well as a connector for each of said harness and the electronic control unit, all of which prohibits a low cost unit. In particular, a separate relay harness is also connected to the electronic control unit, and the need for two harnesses increases the complexity of the design for the harness wiring and for the positioning of the multiple connectors.

Moreover, the external wiring for the power supply harness necessitates a waterproofing mechanism between the said power supply harness and its connector, and between said connector and the connector on the electronic control unit. This presents an additional disadvantage of increased costs for waterproofing of the device.

SUMMARY OF THE INVENTION

In view of the aforementioned problems, the objective of this invention is to provide a brake pressure control unit which eliminates the need for external harness wiring, thereby making the unit more compact, less costly, more waterproof, and/or easier to assemble and disassemble.

DESCRIPTION OF THE PREFERRED EMBODIMENTS

Figure 1:
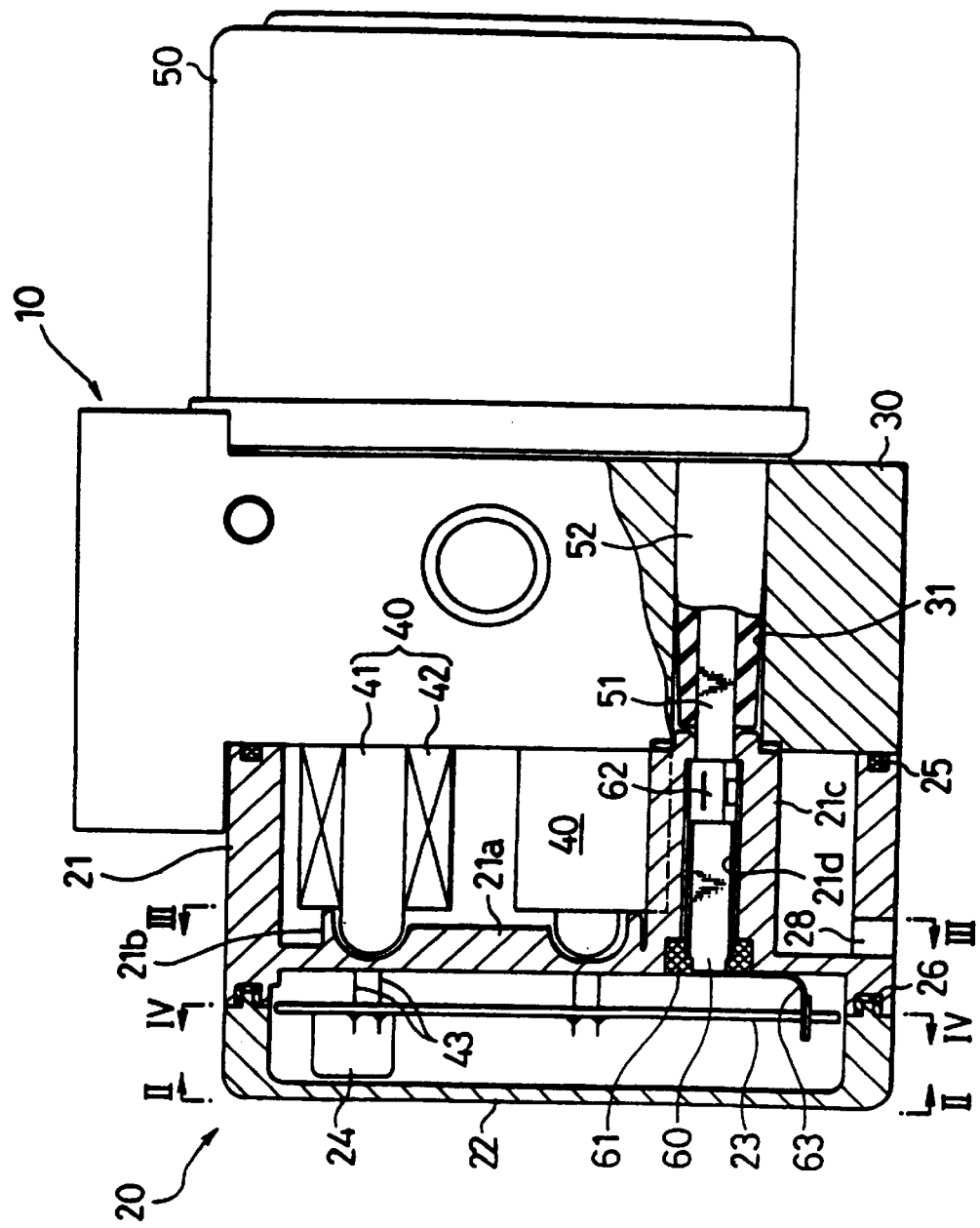
FIG. 1 is a diagram of the brake pressure control device as a whole with a portion of the components exposed.

In a first aspect of the invention, a novel brake pressure control device is provided, comprising: a brake pressure unit equipped with a plurality of solenoid valves, a cover for said solenoid valves; a hydraulic pump and a motor to drive said hydraulic pump; and an electronic control unit which operates the solenoid valves and the motor of said brake pressure unit. A wiring cavity is located within said brake pressure unit, a pair of electrical contacts protrude from the motor to form a male motor connector, a pair of electrical contacts protrude from the cover to form a female cover connector which can be connected to or disconnected from said male motor connector, the male connector thus formed and set inside said wiring cavity and the female cover connector thus formed comprise the power supply to the motor, and the base end of the terminals of said female cover connector are connected directly to the control print circuit board.

In a second aspect of the invention, a novel brake pressure control device is provided in which the control print circuit board of the electronic control unit is set inside said cover and the electronic control unit so configured is integrated with the brake pressure unit into a single unit, and the female cover connector makes an electrical connection with the control print circuit board by means of a relay conductor.

In a further aspect of the invention, a novel brake pressure control device is provided wherein said relay conductor making the electrical connection is a flexible printed circuit (FPC) comprised of a band conductor laminated onto a flexible insulating substrate.

It is to be understood that while the invention has been described in conjunction with the preferred specific embodiments thereof, that the description above as well as the examples which follow are intended to illustrate and not limit the scope of the invention. Other aspects, advantages and modifications within the scope of the invention will be apparent to those skilled in the art to which the invention pertains. The following examples describe preferred embodiments of the invention as shown in the figures.

Explanation of symbols:

10 Brake pressure unit
20 Electronic control unit
21 Cover body
21*a* Cover body partition
21*b* Cover body protrusion
21*c* Wiring tube
21*d* Wiring cavity
22 Cover 23 Control print circuit board
24 Electronic component
30 Valve block
31 Internal wiring cavity
40 Solenoid valve
41 Valve component of solenoid valve
42 Solenoid valve coil
50 Motor
51 Male motor connector
52 Insulating layer
60 Female cover connector

EXAMPLE 1

Overview of Brake Pressure Control Unit

FIGS. 1–5 illustrate an example of an integrated brake pressure control unit comprised of a brake pressure unit 10 and an electronic control unit 20 connected so as to form a single unit.

Brake Pressure Unit

The brake pressure unit 10 is comprised of a valve block 30 in which at least two solenoid valves 40 are mounted (FIG. 1). A hydraulic pump, housed inside said valve block 30, is driven by a motor 50 mounted on the right end (as shown in the diagram) of said valve block. As well, an internal wiring cavity 31 is bored to be virtually parallel to the axis of rotation of the motor within said valve block. Said wiring hole 31 functions as a space to hold the wires for the motor 50, to be described later.

Also molded to a portion of said valve block 30 are ports 32 to which are connected the lines to supply brake fluid to each wheel cylinder. Brake fluid to these lines is supplied via a line connected from the master cylinder to said valve block.

Solenoid Valves

The solenoid valve 40 is a publicly-known type of electromagnetically-actuated valve comprised of a dome-shaped valve component 41 and a cylindrical coil 42 mounted externally around said valve component 41 (FIG. 1). A normally-open or normally-closed valve mechanism is housed inside said valve component 41, and the electromagnetic force of the coil 42 causes the internal valve body to open or close the brake fluid channels.

Contact terminals 43, 43, extending from each coil 42 penetrate through the partition 21a of the cover body 21 and are affixed directly to the control print circuit board 23.

Electronic Control Unit

A cover body 21 and cover 22 (FIG. 1) are set on the side face at the left-end (of the diagram) of the valve block 30, and are affixed so as to be detachable by means of a through bolt or other fastener.

The position of each coil 42 is fixed by the protrusion 21b protruding from the inner face of the partition 21a of said cover body 21 pressing against the head of said coil. In this embodiment, the coil 42 is mounted on the cover body 21 side to enable the brake pressure unit 10 to be separated from the electronic unit 20.

In addition, a wiring tube 21c of a length so as to abut against the valve block 30 is integrally molded on the inner side of the partition 21a at a position separate from the protrusion 21b. A wiring cavity 21d is bored inside said wiring tube 21c.

Figure 2:
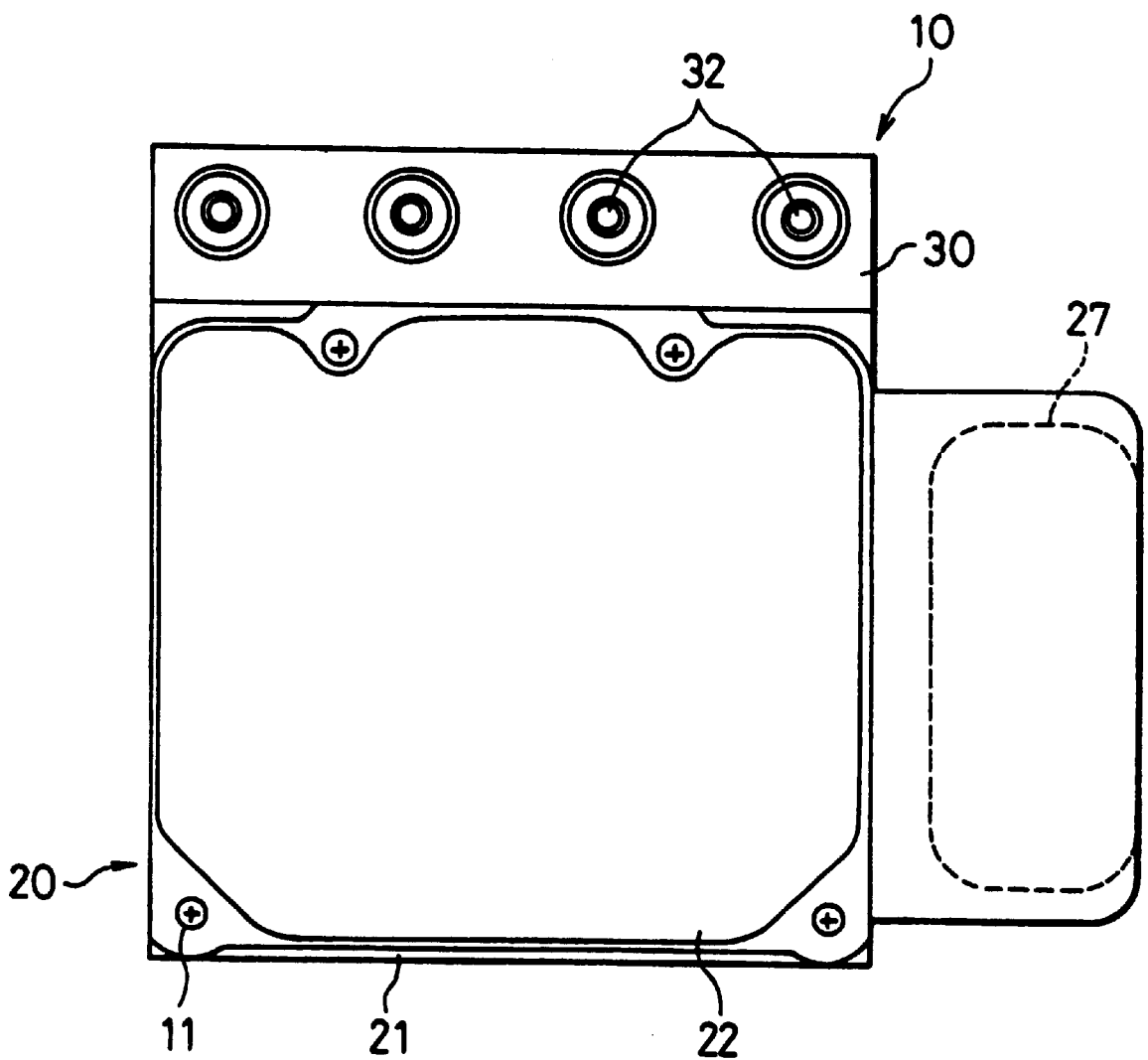
FIG. 2 is a cross section diagram of the brake pressure control device of FIG. 1 as viewed when dissected through II—II.
Figure 3:
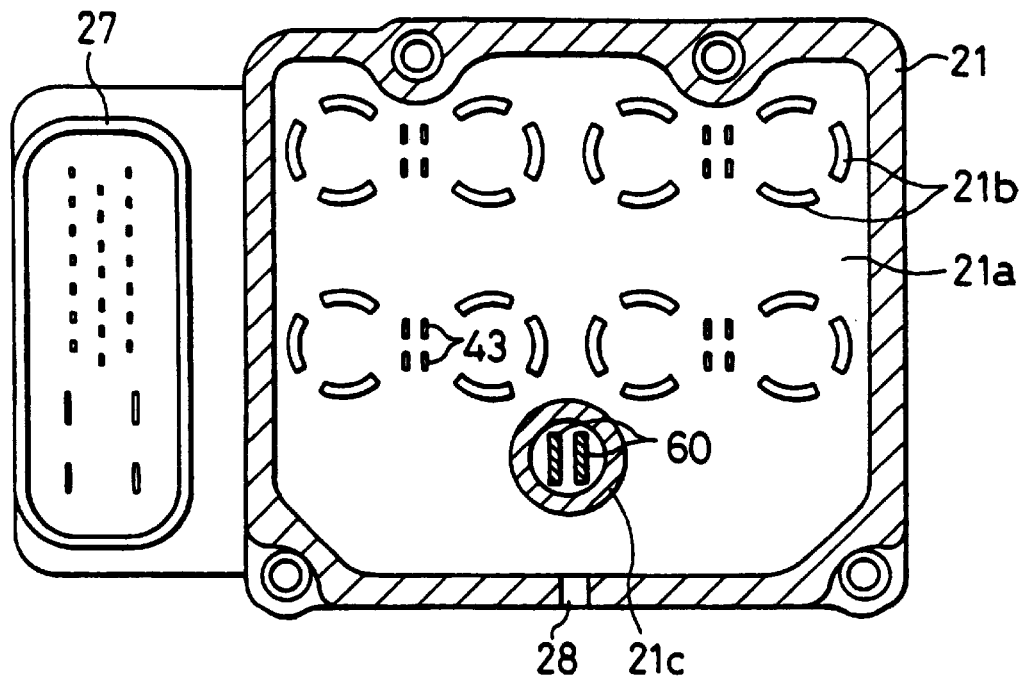
FIG. 3 is a cross section diagram of the brake pressure control device of FIG. 1 of FIG. 1 as viewed when dissected through III—III.
Figure 4:
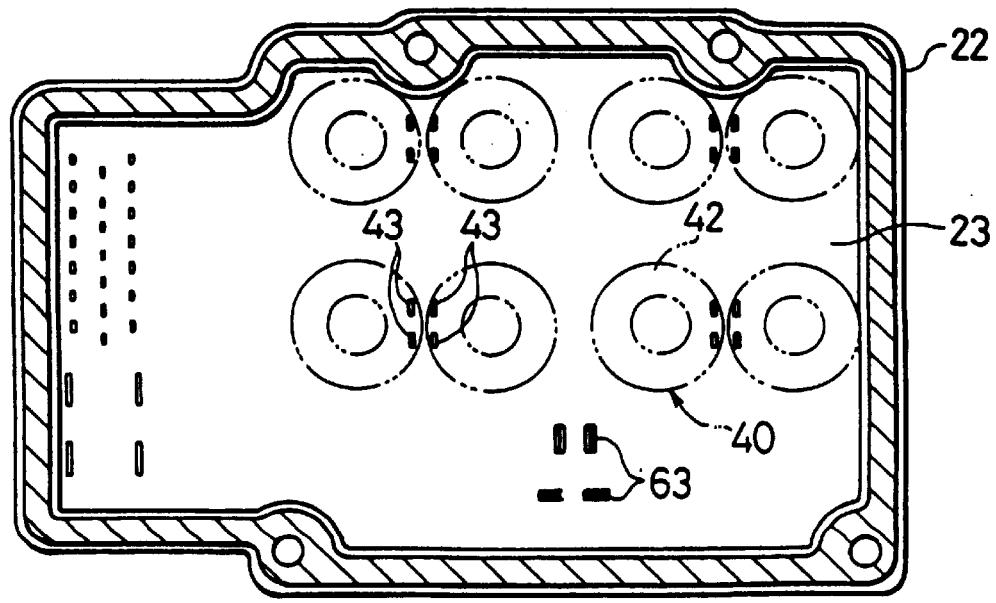
FIG. 4 is a cross section diagram of the brake pressure control device of FIG. 1 of FIG. 1 as viewed when dissected through IV—IV.

The control print circuit board 23 is set on the outer side of said partition 21a, and is mounted onto the cover body 21 by means of a publicly-known cylindrical boss, set screw, or other fastening mechanism. Said control print circuit board 23 contains the electronic components 24 of the electronic control unit, as well as holes in which to inlay the contact terminals 43, 43 of the coil 42, and the terminals for insertion and connection of the relay conductor 63 to be discussed later. The cover 22 is mounted on the partition 21a side of the cover body 21, and serves to protect said control print circuit board 23. Moreover, as shown in FIG. 2 and FIG. 3, a connector 27 is integrally molded onto a portion of the cover 22 such that it can be connected electrically to an external harness not shown in the diagram.

Also as shown in FIG. 1, a sealing material 25 is set around the entire perimeter of the cover body 21 on the opening side and a sealing material 26 is set around the entire perimeter of said cover body on the partition side to form a tight waterproof seal between the valve block 30 and cover body 21, and between the cover body 21 and the cover 22 respectively. Moreover, as shown in FIG. 1 and FIG. 3, a water drainage hole 28 is affixed into the cover body 21.

Power Supply System to the Motor

This invention uses the internal wiring cavity 31 in the brake pressure unit 10 and the wiring cavity 21d inside the wiring tube 21c for the wiring of the motor 50. That is, as shown in FIG. 1, the motor 50 has a male motor connector comprised of a pair of protruding contacts 51, 51 extending axially from the motor, the greater portion of which are encased in an insulating layer 52 made, for example, from a resin mold, and only the tips are exposed. The diameter of said insulating layer is large enough so as to be enclosed in the mouth of the internal wiring cavity 31.

Figure 5:
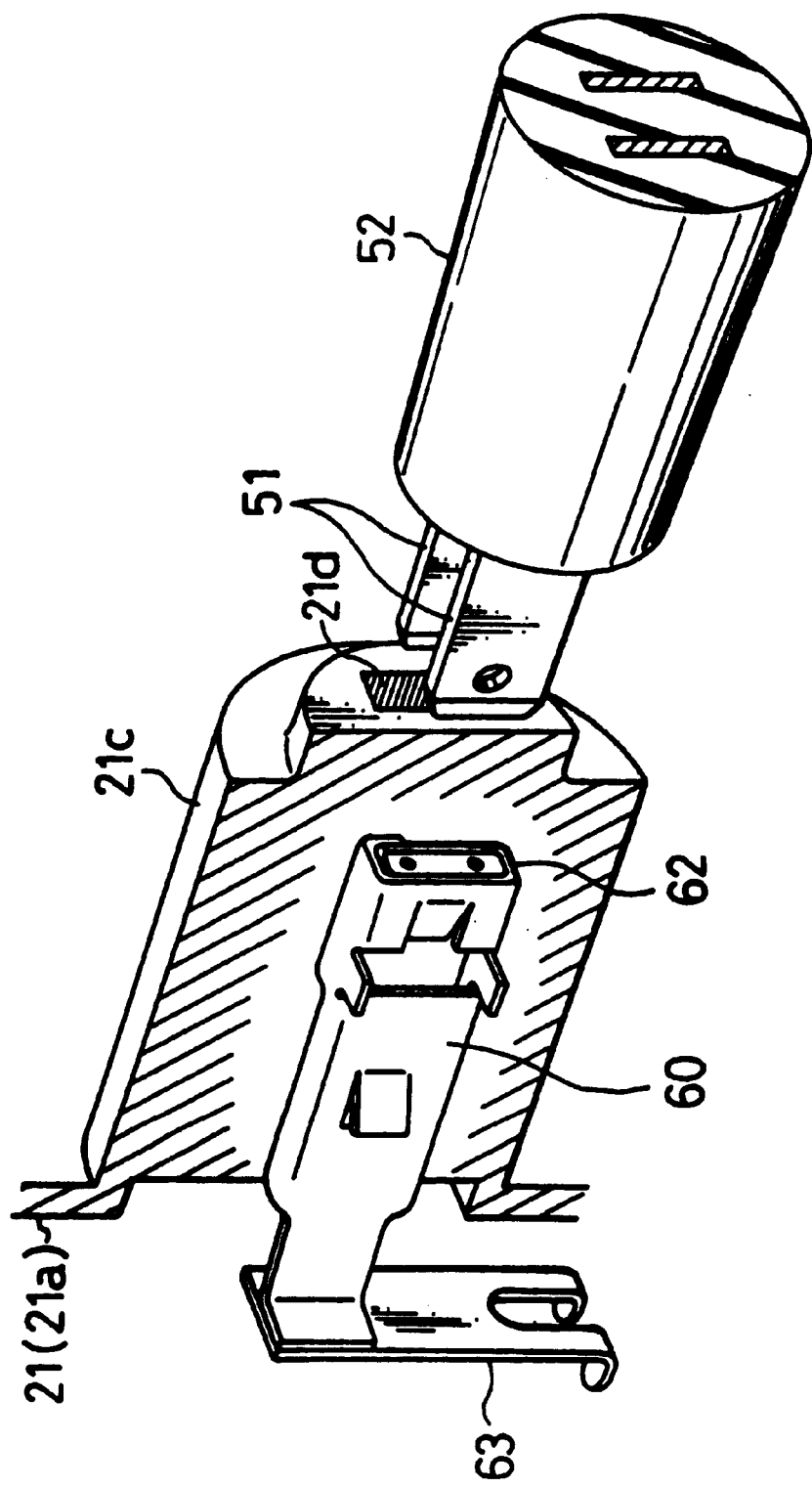
FIG. 5 is a diagram of the power supply for the motor comprised of the male motor connector and the female cover connector.

Meanwhile, the cover has a female cover connector, comprised of a pair of cover contacts 60, 60 inserted into the wiring cavity 21d of the cover body 21 such that their removal is restricted. The mouth of the wiring cavity 21d is closed off with the sealing material 61, leaving the upper portion of the cover contacts 60, 60 protruding out of said sealant. Said female cover connector 60 has a receptacle segment 62, wherein an electrical connection is made by plugging the male motor connector 51 into said receptacle 62 and is severed by pulling out the motor 50 and its attached male connector 51. This male motor connector 51 and the female cover connector 60, as shown in FIG. 5, comprise the power supply conductor to the motor 50. It is noted that the receptacle 62 can instead be molded onto the motor with the male and female connectors reversed.

In addition, as shown in FIG. 1, the area between the exposed portion of the cover contacts 60, 60 and the control print circuit board 23 can be connected electrically by means of the relay conductor 63. Aside from a conductive plate, other components that could be used as said relay conductor 63 include a flexible printed circuit (FPC) which is a busbar configured from a flexible insulating substrate laminated with a band conductor. In this case, the power transmitted from the control print circuit board 23 is supplied via the relay conductor 63 and the female cover connector 60 to the male motor connector 51 to drive the motor.

In some cases, the control print circuit board 23 itself is configured from a multilayered laminated busbar, and the conducting components of said busbar are connected to the female cover connector 60 and the contact terminals 43, 43 of the coil 42 respectively.

This configuration of connecting the control print circuit board 23 and the motor 50 by a detachable male motor connector 51 and female cover connector 60 means that should there be a malfunction necessitating an inspection of the motor 50, hydraulic pump, or the internal components of the electronic control unit, then the motor 50 alone or the cover body 21 alone can be easily removed from the brake pressure unit 10 and thereafter easily re-assembled.

EXAMPLE 2

Figure 6:
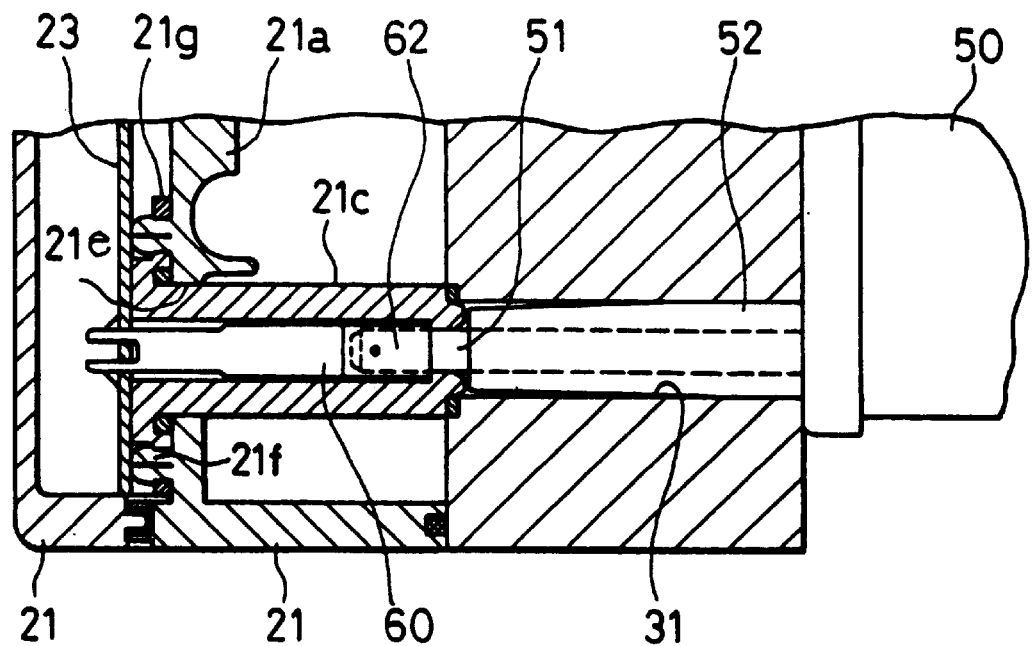
FIG. 6 illustrates another embodiment of the invention in which the wiring tube has been configured into a separate unit.

FIG. 6 illustrates an alternative embodiment in which the wiring tube 21c is configured separately. Those components which are the same as for the aforementioned embodiment are identified by the same symbols, and an explanation is omitted here.

A cavity 21e through which the wiring tube 21c can pass is bored through the partition 21a of the cover body 21, and a plural number of cylindrical bosses 21f protrude around the perimeter of said hole 21e. To mount the wiring tube 21c in the cover body 21, said wiring tube 21c is inserted through the hole 21e, and said bosses 21f penetrate through a flange 21g molded on said inserted end of the wiring tube 21c.

Figure 7:
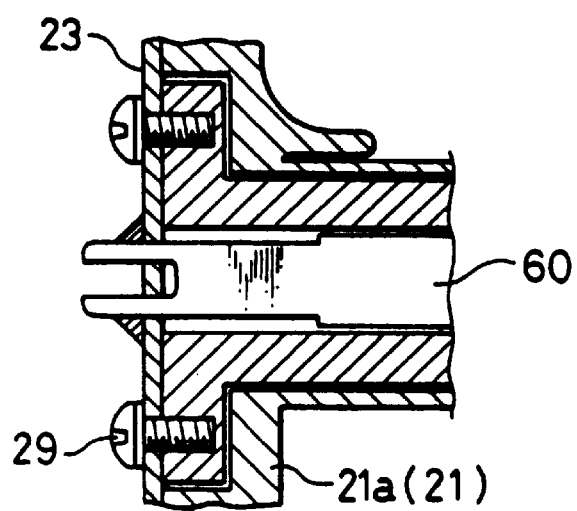
FIG. 7 illustrates an alternative embodiment for attaching the wiring tube to the control substrate.

Or, as shown in FIG. 7, the wiring tube 21c can be attached to the control print circuit board 23 by screwing a small screw 29 between the control print circuit board 23 and the flange 21g of the wiring tube 21c.

Alternatively, the female cover connector 60 can penetrate through the partition 21 of the cover body 21 and be connected directly to the control print circuit board 23.

This embodiment has the advantage that the relay conductor 63 in the aforementioned FIG. 1 is omitted, thereby making the overall device more compact.

EXAMPLE 3

The aforementioned examples have both explained an embodiment of this invention in which the brake pressure unit 10 and the electronic control unit 20 are integrated into a single unit to form an integral type of brake pressure control device. However, the electronic control unit 20 can be positioned independently inside the passenger compartment of the vehicle in a so-called separator type of brake pressure control device.

In the separator type, an electrical connection can be made between the variety of power supply conductors for the motor 50 laid inside the cover 22 and the connector 27 molded to a portion of the cover 22 by means of either of the following types of relay conductors:

(1) busbar system (2) flexible printed circuit (FPC)

(3) lead wires, or (4) a combination of components (1)–(3).

EXAMPLE 4

Figure 8:
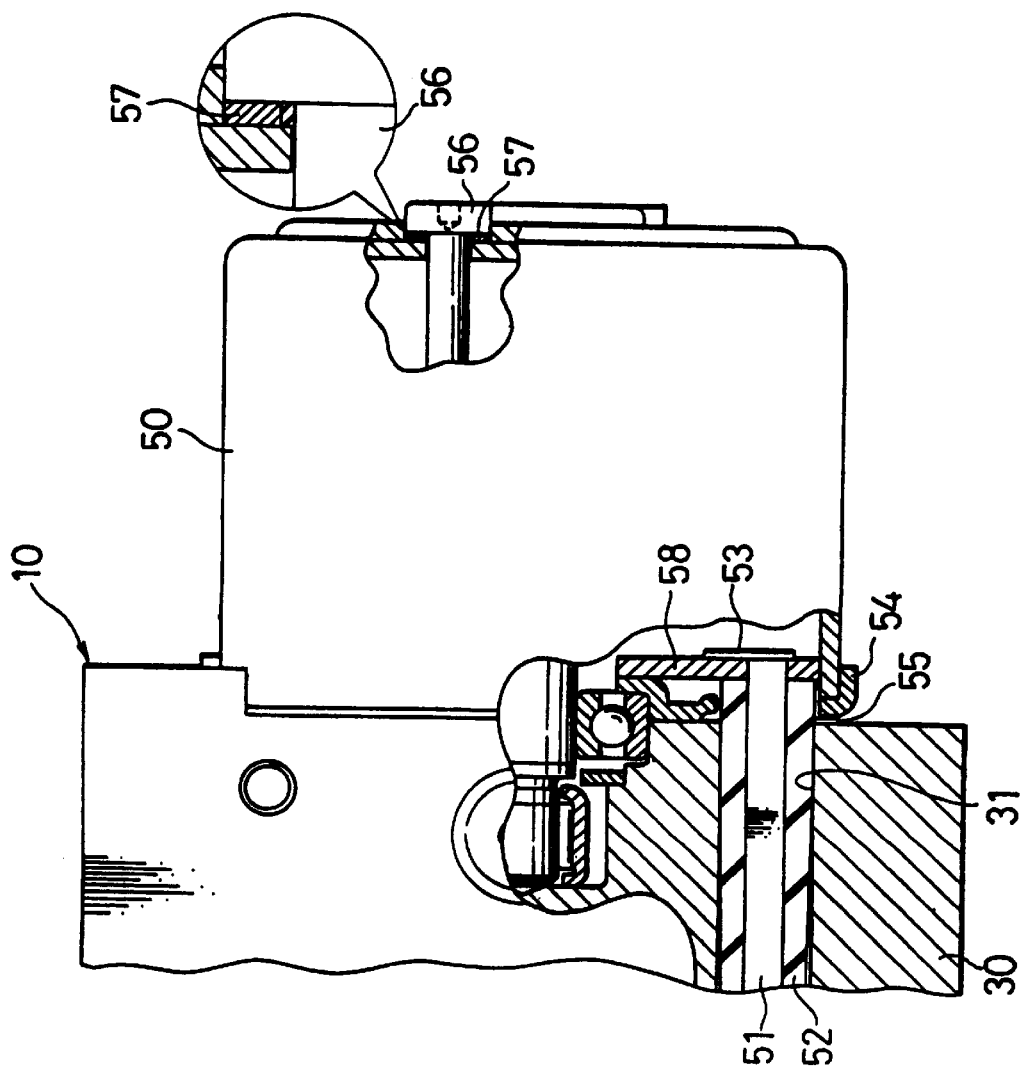
FIG. 8 illustrates an alternative embodiment of the invention where the male motor connector of the motor is integrally molded with the brush terminal, and the insulating cover of the motor terminal is integrally molded with the brush holder.

FIG. 8 illustrates another embodiment of this invention in which the base end of the male motor connector 51 of the motor 50 is integrally molded with the brush terminal 53, and the insulating layer 52 covering the motor terminal 51 is integrally molded with the brush holder 58. In addition, a seal ring 55 can be inserted between the side face of the valve block 30 and the front block 54 of the motor 50 as shown in FIG. 8; or a seal washer 57 can be set on the head of the through bolt 56 affixing the motor 50 to the valve block 30 in order to waterproof the unit.

Figure 9:
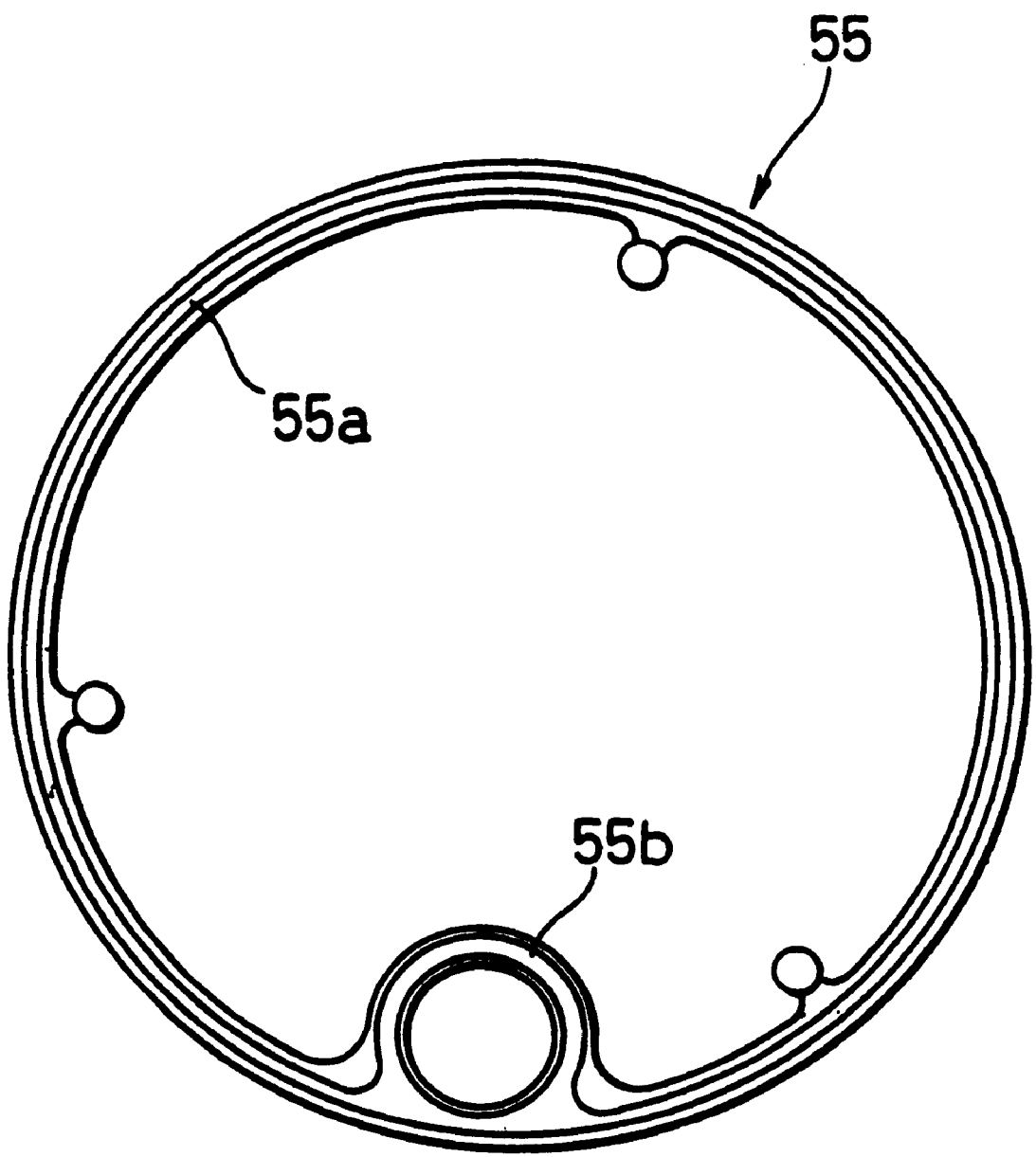
FIG. 9 is a planar diagram of a preferred arrangement of a seal ring between the valve block and the motor.

FIG. 9 is a planar diagram illustrating a more preferable arrangement of the seal ring 55, wherein a large diameter ring 55a which seals the space between the motor 50 and the valve block 30 is integrally molded with a small diameter ring 55b sealing the perimeter of the insulating layer 52.

Moreover, an opening can be bored in the motor 50, and the internal and external pressure differential of the motor can be eliminated by covering said opening with a breathable material. In this case, the breathable material should allow air to pass through but should prevent water and oil from penetrating, such as the publicly-known Gore-tex or similar material.

As explained above, this invention provides the following advantages.

1. The power supply for the motor is configured from a detachable connector, which facilitates the dismantling or the re-assembly of the motor or electronic control unit.

2. The power supply for the motor is set inside the brake pressure unit and is not exposed; moreover, the conventional power supply harness can be omitted to provide a low-cost compact brake pressure control device.

3. By setting the power supply for the motor inside the brake pressure unit, a high degree of waterproofing can be secured by a simpler means than that required for the exterior wiring format.

4. The invention enables a general-purpose design; that is, the brake pressure unit can be integrated with the electronic control unit, or the electronic control unit can be a separate unit located inside the passenger compartment of the vehicle.

What is claimed is:

1. A brake pressure control device comprising:

a brake pressure unit comprising a valve block having an internal wiring cavity and ports for hydraulic attachment to a master cylinder and to each of one or more wheel cylinders, solenoid valves mounted within said valve block for hydraulic attachment to a wheel cylinder and having contact terminals extending through said valve block, and a hydraulic pump housed within said valve block and hydraulically connected to said solenoid valves and to said ports;

a motor mounted on the valve block to drive said hydraulic pump, said motor comprising a pair of electrical contacts forming a motor connector covered with an insulating layer directly and substantially within said internal wiring cavity; and an electronic control unit, integrally attached to said brake pressure unit and electrically connected to said pair of electrical contacts, which operates each solenoid valve and the motor of said brake pressure unit, said electronic control unit having a cover connector electrically connectable to or disconnectable from said motor connector covered with an insulating layer directly within said internal wiring cavity, wherein said cover connecter and said motor connector are electrically connected by a male/female connection comprising a pair of positive and negative contacts.

2. The brake pressure control device of claim 1, wherein said electronic control unit further comprises a control print circuit board connected directly to base ends of said pair of electrical contacts of the cover connector.

3. The brake pressure control device of claim 2, further comprising a cover for said solenoid valves adapted to separate the brake pressure unit from the electronic control unit.

4. The brake pressure control device of claim 3 in which a control substrate of the electronic control unit is set inside said cover and the electronic control unit so configured is integrated with the brake pressure unit into a single unit, and the cover connector makes an electrical connection with the control substrate by means of a relay conductor.

5. The brake pressure control device of claim 4, wherein said relay conductor is a flexible printed circuit (FPC) comprised of a band conductor laminated onto a flexible insulating substrate.

6. A motor to drive a hydraulic pump in a brake pressure control device, comprising a pair of electrical contact terminals forming a motor connector covered with an insulating layer, wherein said motor is mounted on a valve block of said device such that the motor connector covered with an insulating layer is received directly and suubstantially within an internal wiring cavity of the valve block, wherein said motor connector is a male or female connector comprised of a pair of positive and negative contacts.

7. An electronic control unit for a brake pressure control device,

- wherein said electronic control unit is integrally attachable to a brake pressure unit of said device and electrically connectable to contact terminals of one or more solenoid valves of said device,
- wherein said electronic control unit is electrically connected to a motor connector covered with an insulating layer of the motor of said device directly and substantially within an internal wiring cavity of the brake pressure unit when attached thereto by a male/female connection comprising a pair of positive and negative contacts,
- wherein said electronic control unit operates the motor and each solenoid valve when attached to the brake pressure unit and the contact terminals and the motor connector.

8. A brake pressure unit of a brake pressure control device comprising:

- a valve block having an internal wiring cavity bored through it and ports for hydraulic attachment to a master cylinder and to each of one or more wheel cylinders;
- a solenoid valve mounted within said valve block for hydraulic attachment to a wheel cylinder and having contact terminals extending through said valve block;
- a hydraulic pump housed within said valve block and hydraulically connected to said solenoid valves and to said ports; and
- a motor to drive said hydraulic pump, comprising a pair of electrical contact terminals forming a motor connector covered with an insulating layer, wherein said motor is mounted on a valve block of said device such that the motor connector covered with an insulating layer is received directly and substantially within an internal wiring cavity of the valve block, wherein said motor connector covered with an insulating layer is a male or female connector comprised of a pair of positive and negative contacts.

* * * * *